US011720005B2

(12) United States Patent
Scheich

(10) Patent No.: US 11,720,005 B2
(45) Date of Patent: Aug. 8, 2023

(54) CAMERA MOUNT FOR VEHICLE PHOTOGRAPHIC CHAMBERS

(71) Applicant: Carvana, LLC, Tempe, AZ (US)

(72) Inventor: Davo Scheich, Troy, MI (US)

(73) Assignee: Carvana, LLC, Tempe, AZ (US)

( * ) Notice: Subject to any disclaimer, the term of this patent is extended or adjusted under 35 U.S.C. 154(b) by 72 days.

(21) Appl. No.: 17/432,459

(22) PCT Filed: Feb. 18, 2020

(86) PCT No.: PCT/US2020/018602
§ 371 (c)(1),
(2) Date: Aug. 19, 2021

(87) PCT Pub. No.: WO2020/172141
PCT Pub. Date: Aug. 27, 2020

(65) Prior Publication Data
US 2022/0066294 A1    Mar. 3, 2022

Related U.S. Application Data

(60) Provisional application No. 62/807,580, filed on Feb. 19, 2019.

(51) Int. Cl.
*G03B 17/56* (2021.01)
*G03B 15/06* (2021.01)
(Continued)

(52) U.S. Cl.
CPC ........... *G03B 17/561* (2013.01); *G03B 15/06* (2013.01); *H04N 23/56* (2023.01); *H04N 23/90* (2023.01)

(58) Field of Classification Search
None
See application file for complete search history.

(56) References Cited

U.S. PATENT DOCUMENTS 4,804,983 A * 2/1989 Thayer, Jr. ............. G03B 17/53
396/374
5,446,515 A * 8/1995 Wolfe .................... G03B 17/53
396/3
(Continued)

FOREIGN PATENT DOCUMENTS

CN    207560161 U    6/2018

OTHER PUBLICATIONS

Int'l Search Report for PCT/US2020/018602, dated Jun. 22, 2020.

*Primary Examiner* — Rodney E Fuller
(74) *Attorney, Agent, or Firm* — Snell & Wilmer, L.L.P.

(57) ABSTRACT

A camera mount is provided for photographing vehicles in photo booths or circular domed structures where an automated process captures a series of vehicle images, and uploads the captured images to a web template for display and recordation. The mount has an adjustable base that supports a camera and provides a range of camera angles, positions, and tilts as needed. The base is attached to an enclosure box of the mount, and the enclosure box attaches to a frame that affixes to an exterior portion of a wall of the photo booth and keeps the camera plumb and square. The mount allows for quick camera replacement without having to aim the camera. A single backup unit may be installed into any camera position no matter what tilt or angle the camera is set at. The mount has an automated shutter flap that hides the camera when not in use.

20 Claims, 16 Drawing Sheets

(51) Int. Cl.
*H04N 23/56* (2023.01)
*H04N 23/90* (2023.01)

(56) References Cited

U.S. PATENT DOCUMENTS

| | | | |
|---|---|---|---|
| 9,046,740 B1* | 6/2015 | Smithweck | G03B 15/06 |
| 10,063,758 B2* | 8/2018 | Scheich | H04N 23/90 |
| 11,412,135 B2* | 8/2022 | Scheich | H04N 23/661 |
| 2012/0087643 A1* | 4/2012 | Paramadilok | E04H 1/125 |
| | | | 396/2 |
| 2014/0152806 A1 | 6/2014 | Hauk | |
| 2016/0381323 A1 | 12/2016 | Garcia, III et al. | |
| 2017/0051547 A1 | 2/2017 | Albrecht | |
| 2018/0160019 A1* | 6/2018 | Scheich | G06T 1/0007 |

\* cited by examiner

Detail C

Detail D

CAMERA MOUNT FOR VEHICLE PHOTOGRAPHIC CHAMBERS

RELATED APPLICATIONS

This application claims priority benefit of U.S. Provisional Application Ser. No. 62/807,580 filed 19 Feb. 2019, the contents of which are hereby incorporated by reference.

FIELD OF THE INVENTION

The present invention in general relates to a system for photographing vehicles; and in particular, to a camera mount enclosure for use with a photo booth or an enclosable domed structure where an automated process captures a series of vehicle images and uploads the captured images to a web template for display and recordation.

BACKGROUND OF THE INVENTION

Online auto sales and auto auctions have been growing in popularity. One of the most popular online auctions to buy vehicles from is eBay™. On eBay Motors™, a user can create an account and put their vehicles up for auction. Other popular websites include cars.com™. Typically, online vehicle sales are based solely on images of the vehicle, since the buyer is in a remote location and is unable to view the vehicle in question in person. Thus, many high quality images are required of the vehicle from many perspectives to allow a buyer to gain an understanding of a subject vehicle's condition and appearance. FIGS. 1A and 1B are typical non-studio quality vehicle photographs that are used to list vehicles for sale. The images shown in FIGS. 1A and 1B are of low quality and require a dedicated employee to move vehicles and physically move around the subject vehicle to take the pictures. The photographer also has to manually collate the images, name, and upload the files, which is a labor intensive and time consuming task, considering one photographer may be required to shoot upwards of 75 vehicles a day.

Furthermore, producing high quality images is not only time consuming, but is costly and requires a studio set up. Vehicle images are particularly hard to obtain without unwanted reflections of the photographer or the surroundings; however reflection free images are critical to be able to discern surface imperfections, scratches, and dents on a vehicle surface. FIGS. 2A and 2B illustrate an existing studio configuration 10 for generating a contrast break line 12 on a vehicle with additive lighting. The bottom edge 16 of a light box 14 creates the break line 12 between highlight and shadow. FIGS. 3A and 3B illustrate an existing studio configuration 20 for generating a contrast break line 12 on a vehicle with subtractive lighting. The bounce fill light is a large source and makes a soft reflection in the sheet metal. A gray wall is added to "subtract" the reflection from the lower half of the truck to create contrast and shape.

While these studio shots are effective in creating high quality vehicle images, the studio shots are not amenable to the high throughput required for high volume vehicle sales. Thus there is a need to be able to rapidly produce high quality reflection free images of vehicles from multiple angles and perspectives.

In order to increase throughput for creating high quality vehicle images a drive through photographic tunnel as disclosed in U.S. Pat. No. 10,063,758 issued Aug. 28, 2018 and a circular dome photographic booth as disclosed in U.S. patent application Ser. No. 15/834,374 filed Dec. 7, 2017 both of which are included herein by reference in their entirety have been implemented. Both the photographic tunnel and circular dome have a plurality of cameras mounted within the walls for recording images of a vehicle that are uploaded to a database that is used to generate image data from the vehicle positioned in the structure. The systems further include a lighting system and a tracking system to actuate one or more of the plurality of cameras and lights in a predetermined sequence and combination based on the position of the vehicle within the circular domed structure.

However there continues to be need for improved camera mountings that allow for precise positioning and easy change out of camera equipment mounted to photographic chambers. There is a further need of preventing the cameras from appearing in reflective surfaces of vehicles being photographed within photographic chambers.

SUMMARY OF THE INVENTION

A camera mount is provided for photographing vehicles in a photographic booth. The mount includes a frame affixed to an outer portion of a wall of the photographic booth with a set of registration bolts, and an enclosure box with a set of guide tracks. The enclosure box is removably connected to the set of registration bolts with a base for supporting a camera, the base riding along the set of guide tracks. A shutter flap is attached to the frame, and positioned in or over an aperture in the wall, the aperture providing a field of view for the camera, where the shutter flap is in an open position when the camera is in operation, and is closed otherwise.

A system for photographing vehicles is provided using, the system including one or more camera mounts as disclosed above and that are attached to the walls of a photographic booth. At least one camera, video system, or computing system is used to generate image data from a vehicle positioned therein. The system further incudes a lighting system, and a tracking system to actuate one or more of a plurality of cameras, shutter flaps, and lights in a predetermined sequence and combination based on the position of the vehicle.

A process for photographing a vehicle is provided that includes driving the vehicle into the photographic booth equipped with the camera mounts described above, selectively illuminating a first subset of lights arrayed in the dome, selectively opening a first shutter flap from one or more shutter flaps positioned in the photographic booth, collecting a first photograph of a plurality of photographs of the vehicle with illumination from the first subset of lights, and closing the first shutter flap. The process continues by selectively illuminating a second subset of lights arrayed in the dome and opening a second shutter flap, and collecting a second photograph of the plurality of photographs of the vehicle with illumination from the second subset of lights.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1A:
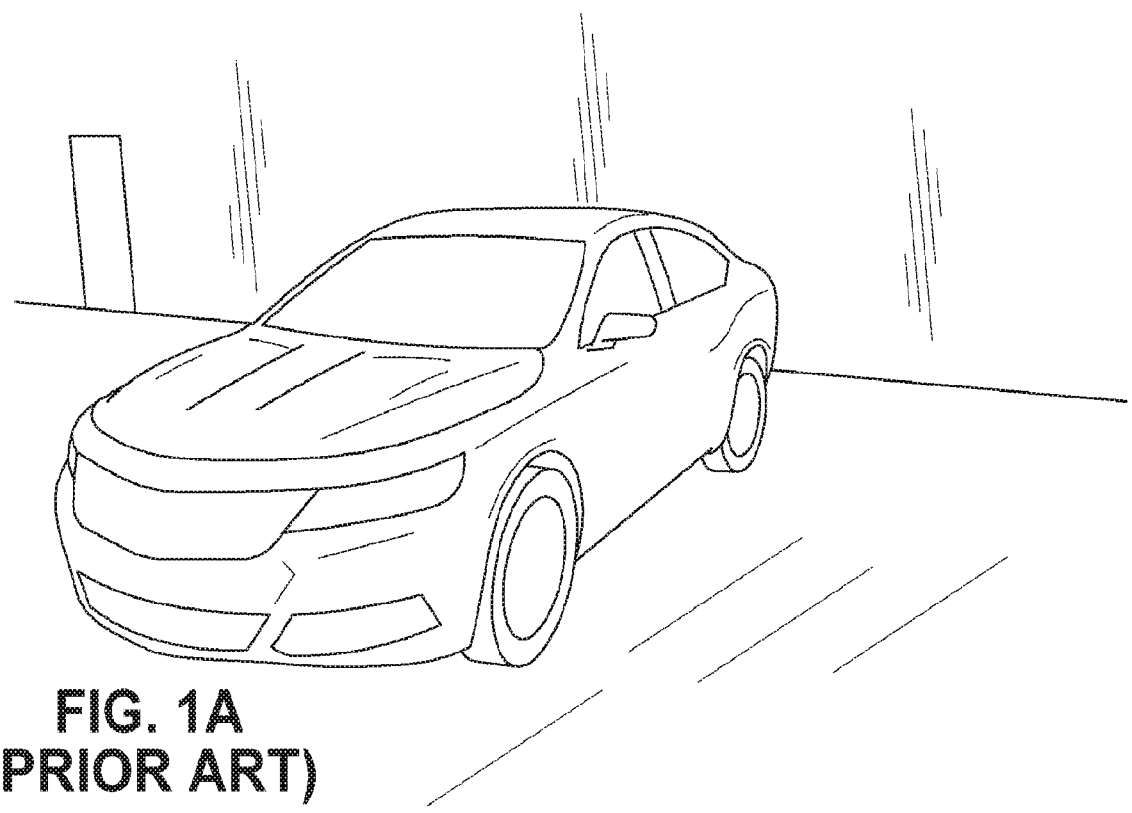
FIGS. 1A and 1B are typical non-studio quality vehicle photographs.
Figure 1B:
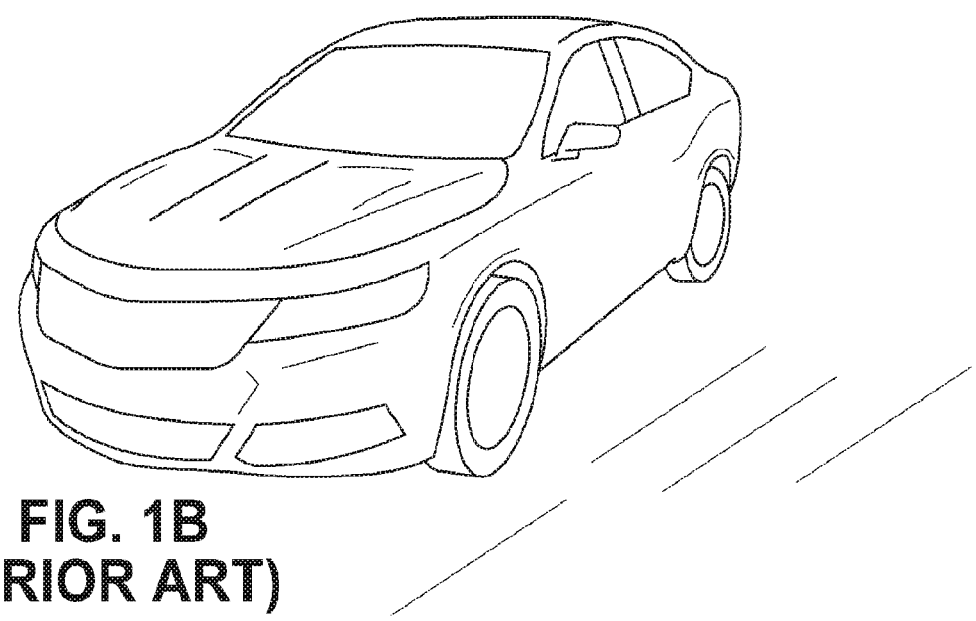
Figure 2A:
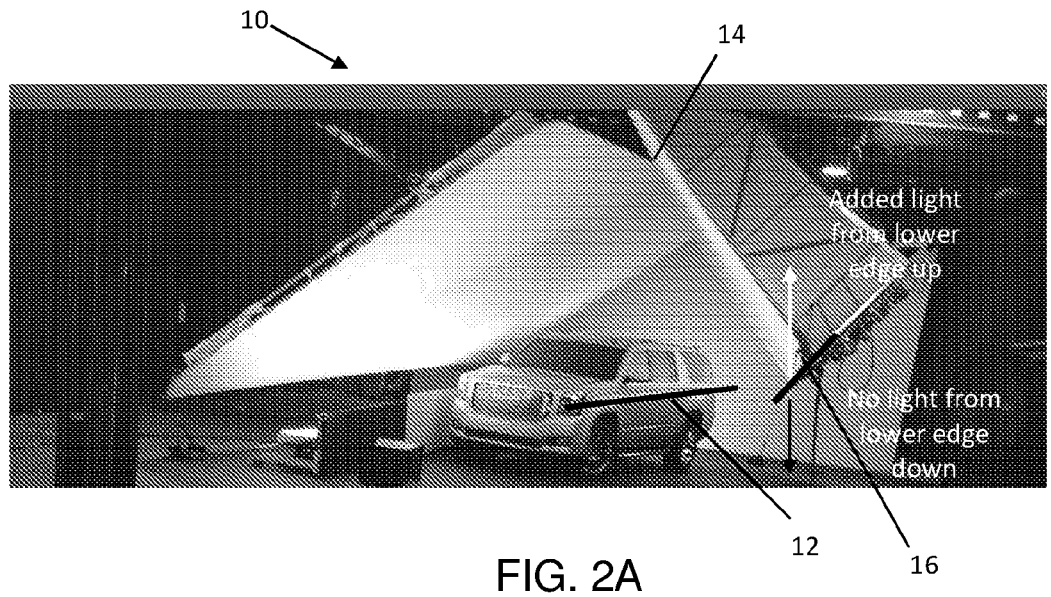
FIGS. 2A and 2B illustrate an existing studio configuration for generating a contrast break line on a vehicle with additive lighting.
Figure 2B:

The present invention has utility as a camera mount for automatically photographing vehicles in a photo booth or a circular domed structure where an automated process captures a series of vehicle images, and uploads the captured images to a web template for display and recordation.

Embodiments of the inventive camera mount have an adjustable base that supports the camera and provides a range of camera angles, positions, and tilts as needed. The base is attached to an enclosure box of the camera mount, and the enclosure box attaches to a frame that affixes to an exterior portion of a wall of the photo booth and keeps the camera mounted plumb and square. Embodiments of the inventive camera mount allow for quick camera replacement without the need to aim the camera. A single backup unit may be installed into any camera position no matter what tilt or angle the camera is set at. The use of multiple cameras in a round photo booth, as disclosed in U.S. patent application Ser. No. 15/834,374 filed Dec. 7, 2017, eliminates the need to have a rotating stage for photographing a vehicle from multiple angles, and increases throughput by up to ten times since there is no longer a need to wait for turntable rotation past a single camera. Embodiments of the inventive camera mount are equipped with an automated shutter flap that hides the camera when not in use, and prevents the camera from appearing in reflective surfaces of the vehicle being photographed. Embodiments of the shutter flap blend into the background walls of the photo booth and prevent the many black holes or cameras that are in the background from appearing as black spots reflected in a vehicle surface.

The images captured in photo booths using embodiments of the inventive camera mount and shutter flap have controlled reflections from multiple angles and perspectives, and a viewer is able to discern whether there are surface imperfections, scratches, and dents on a vehicle surface. Reflections are controlled in the circular domed chamber with curved walls and a matching contoured door that are covered with a light scattering sheet material such as a white canvas or gray walls. In specific embodiments of the inventive image capture system, the lighting style used to illuminate the vehicle within the enclosed circular chamber configuration is a sunset horizon style of lighting, where the lights are hidden below the curved wall that may be gray or white so as to use a sunset style reflection on the vehicle surface through subtractive lighting. A sunset style reflection refers to a hot horizon line on the vehicle with a rapid fall off (i.e., a sunset shot). In some inventive embodiments, light reflection from the sheet metal is hidden in the resulting images through lighting control. For example, in a specific embodiment the lighting around the dome is controlled in such a way to maintain a consistent value of the vehicle's reflection. During the rotation, as the sheet metal becomes more efficient, relative to the camera position, the lighting is adjusted to compensate. It is appreciated that the light is much stronger at the profile view while it tapers off as it approaches a ¾ or ⅞ view. At these angles the rear lighting in the booth must be dimmer to appear consistent throughout.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Embodiments of the inventive camera mounts used in an enclosable circular domed photographic booth provide a photography stage with horizontal lighting that may be configured as subtractive lighting that utilizes a series of cameras and/or camera groups and associated lighting elements for multi-camera sequenced photographs of a vehicle from various angles when the vehicle is positioned on the stage. In a specific inventive embodiment the vehicle is positioned on a stationary photographic stage and a series of cameras positioned around the perimeter and above the vehicle capture vehicle images in the enclosable domed photographic booth. Alternatively, in an inventive embodiment the photographic stage in the enclosable domed structure may rotate the vehicle past a bank of cameras. The use of sequenced and automated image capture allows for the rapid image processing of vehicles for auction sales, dealer records, as well as car condition assessments for rental agencies, fleet management companies, public safety agencies, municipal and government agencies, etc. A complete set of vehicle images are collected in between 5 and 90 seconds allowing for high throughput imaging associated with an auto auction or manufacturer. Additionally, in certain inventive embodiments, at least one camera is placed behind a shutter. In still other embodiments, the shutter is color and texture matched such that the shutter when closed visual fades into the background. Cameras are placed behind a shutter to hide their reflection when a camera is not currently the active camera.

Embodiments of the inventive enclosable circular domed photographic booth allow for a complete set of multi perspective high quality vehicle images to be obtained and recorded into a template or placed in a shared network folder in less than 90 seconds, and in some instances in approximately 5, 10, or 15 seconds. Thus, once a subject vehicle is photographed in the inventive enclosable circular domed photographic booth, the vehicle is available and ready for sale online based on the uploaded images and VIN uploaded information. The rapid processing time of the inventive enclosable circular domed photographic booth provides images that are equivalent to existing professional photographic staging methods that take several minutes to several hours to obtain a set of vehicle images. The rapid image processing and recordation of vehicle condition allows for new business models such as creating virtual or cyber dealerships where a wholesale customer never takes possession of a subject vehicle, and the vehicle is dropped shipped to the end retail customer. Photos obtained with the inventive system may be sold along with the subject vehicle for use by a purchasing used car retailer, and as it typically takes four days for the buyer to take delivery of the wholesale vehicle, with instant access to the vehicle photos the purchaser can start advertising the vehicle four days prior to physically taking possession of the vehicle.

Embodiments of the inventive enclosable domed photographic booth may utilize radio frequency identification (RFID) tags to identify and record vehicles as the vehicles are processed through the system. The RFID may be related to the vehicle identification number (VIN) of a vehicle to be processed. It is further appreciated that additional identifiers may be used illustratively including barcodes that relate to the VIN. Information related to the vehicle, such as vehicle make, model, body style, and color encoded in the VIN may be used to automatically adjust lighting, the height and/or angle of the gray wall to optimize photographic conditions, as well as camera height, zoom, and camera placement/position for a subject vehicle to be processed. Through control of lighting and camera firing sequence, the driver of a vehicle is virtually invisible as a result of being hidden by glass reflection. Further information that may be related to the RFID or barcode may include a dealership setting that may also indicate which dealer the vehicle is being shot for, and incorporate that dealer's specific preferences such as lighting style, file size and format, number of photo shots and angles to be recorded. RFID or bar code information, read manually or automatically may also be used to project text onto the background of the shot or overlay text onto the file during processing, such as price, dealer name, vehicle specifications, mileage, etc.

Figure 4:
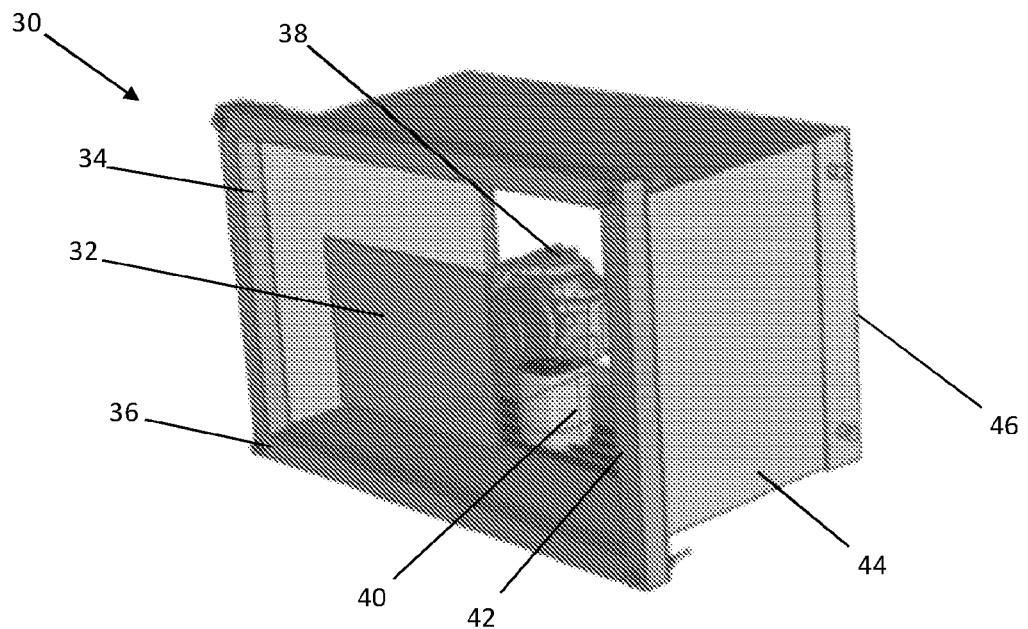
FIG. 4 is a perspective view of a camera mount with a shutter flap in accordance with an embodiment of the invention.
Figure 5:
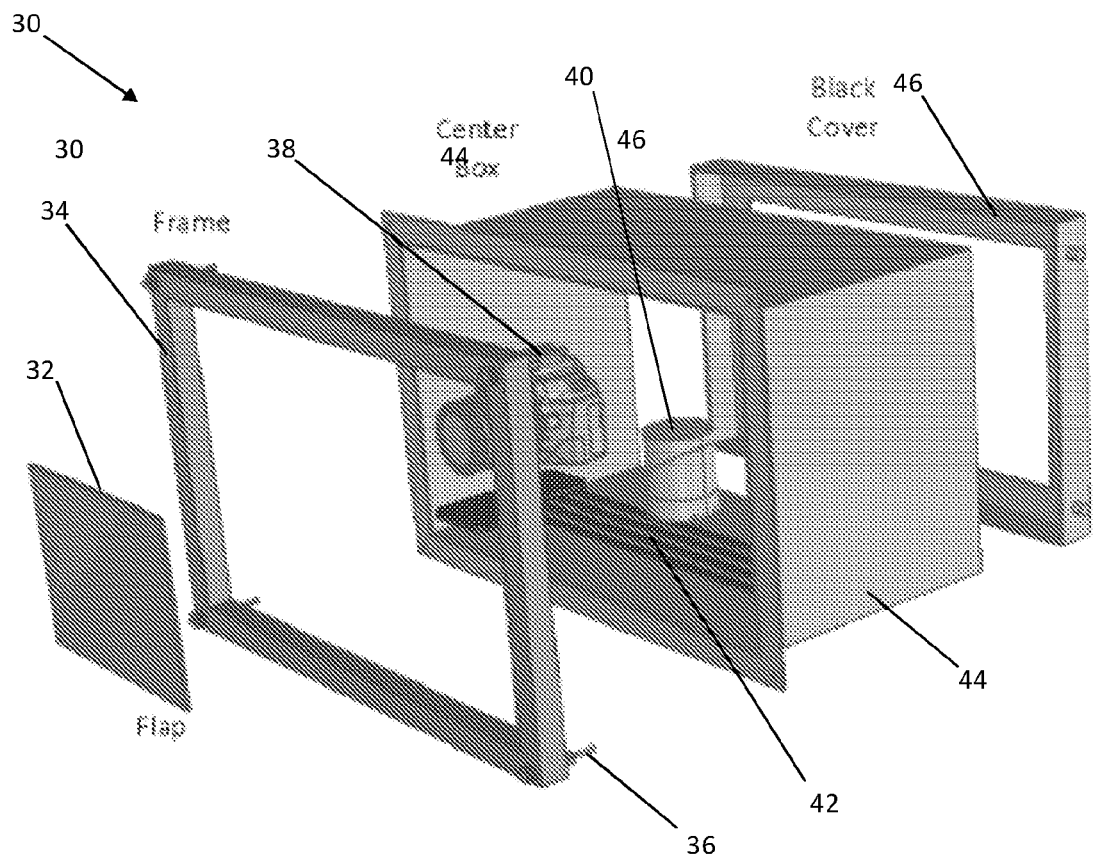
FIG. 5 is an exploded view of the camera mount and shutter flap of FIG. 4 in accordance with an embodiment of the invention.
Figure 6:
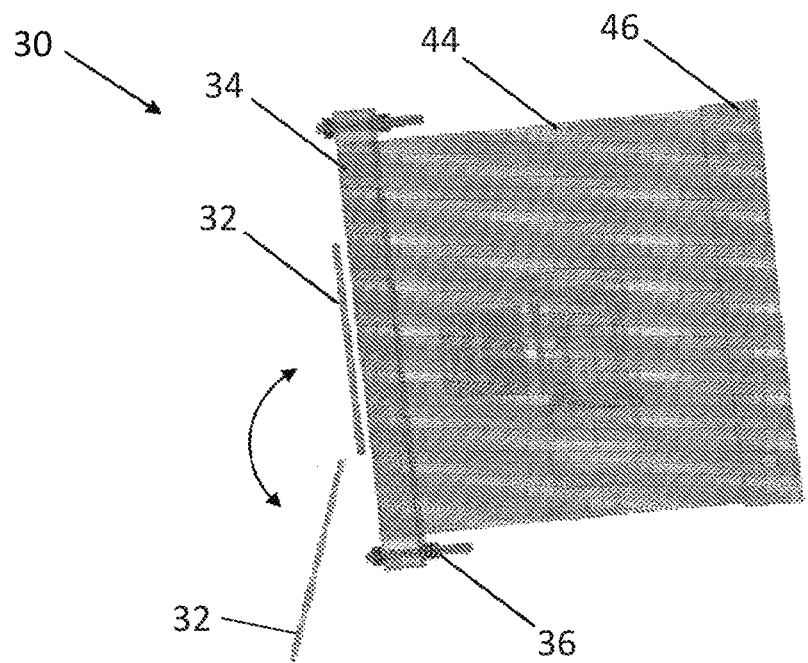
FIG. 6 is a side view of the camera mount of FIG. 4 that shows the open and closed positions of the shutter flap in accordance with embodiments of the invention.
Figure 10:
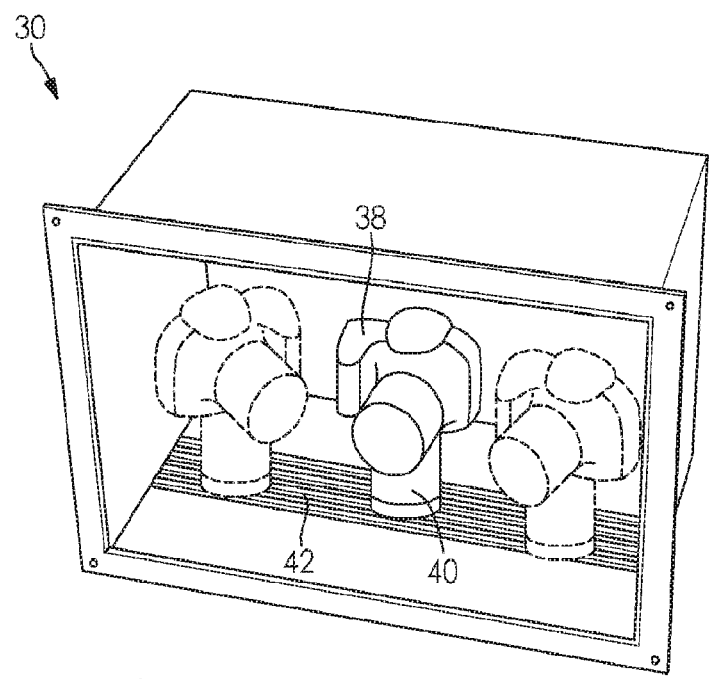
FIG. 10 illustrates movement and positioning of a camera affixed to the base along guide tracks within the enclosure box in accordance with embodiments of the invention.
Figure 11A:
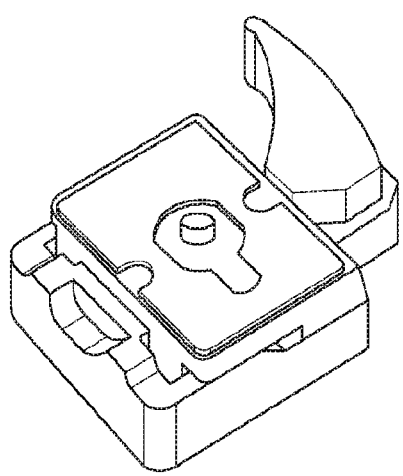
FIGS. 11A-11C illustrate typical prior art photographic mounting hardware for use with the base.
Figure 11B:
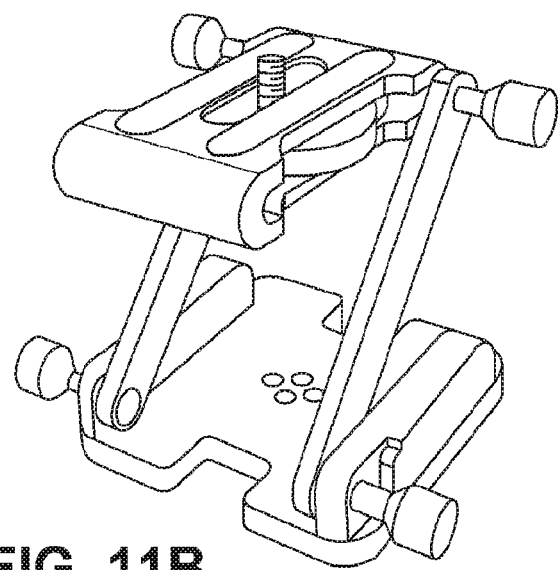
Figure 11C:
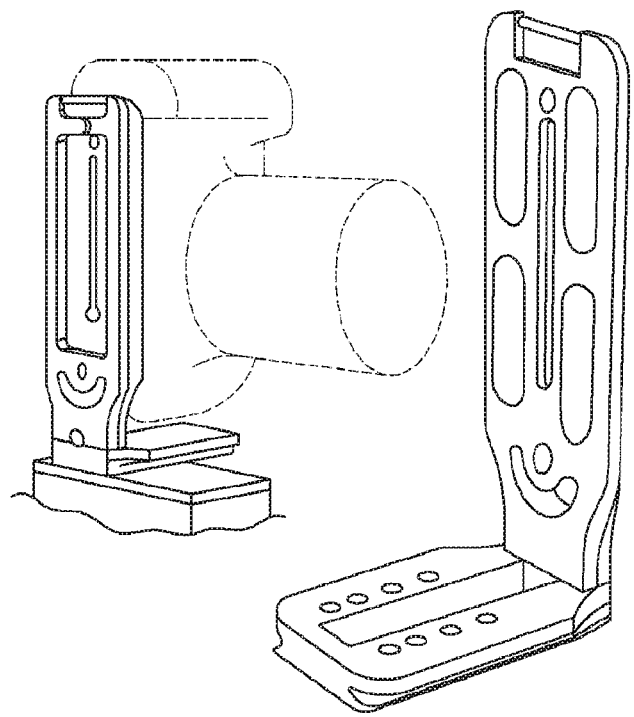

Referring now to the figures, FIG. 4 is a perspective view of an inventive embodiment of a camera mount 30 with a shutter flap 32. The camera mount 30 includes a frame 34 which is affixed to an outer portion of a photo booth wall, an enclosure box 44 with a set of guide tracks 42 on which a base 40 is free to slide from side to side, and a back cover 46 which is removeably attached to the enclosure box 44 and allows access to the enclosed camera 38. FIG. 10 illustrates movement and positioning of a camera along the guide tracks 42. The camera attaches to the base 40 with typical quick release or standard photographic mounting hardware as shown in FIGS. 11A-11C. It is noted that the thumb screws in FIG. 11B may be replaced with security or tamper proof screws or bolts so that an end user cannot change or adjust the position of the camera. Specific embodiments of the base 40 may be pivoted to raise, lower, and angle the camera 38. FIG. 5 is an exploded view of the camera mount 30. FIG. 6 is a side view of the camera mount 30 that shows the open and closed positions of the shutter flap 32. Ideally the shutter flap should have the same color as the interior walls of the photo booth or dome so as to blend into the background when the shutter flap 32 is in a closed position. For a domed shaped photo booth the shutter flap may have a tapered or curved shape to match the contour or beveled shape of the wall.

Figure 7:
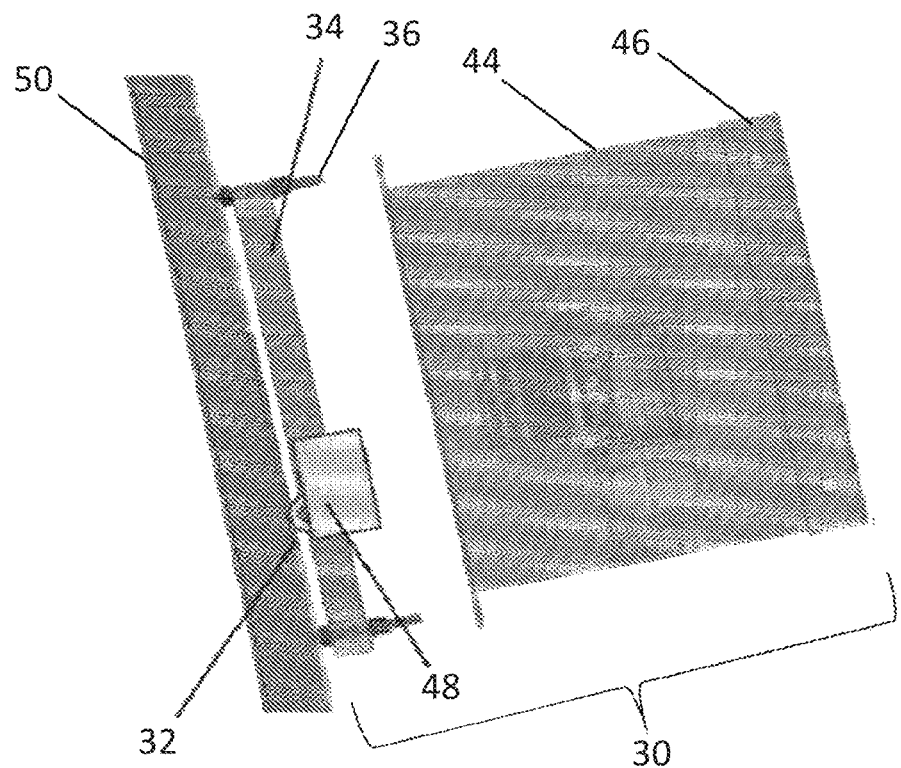
FIG. 7 is a side view of an enclosure box prior to being affixed to a frame both of FIG. 4, which is shown affixed to a wall of a photo booth with registration bolts in accordance with an embodiment of the invention.
Figure 8:
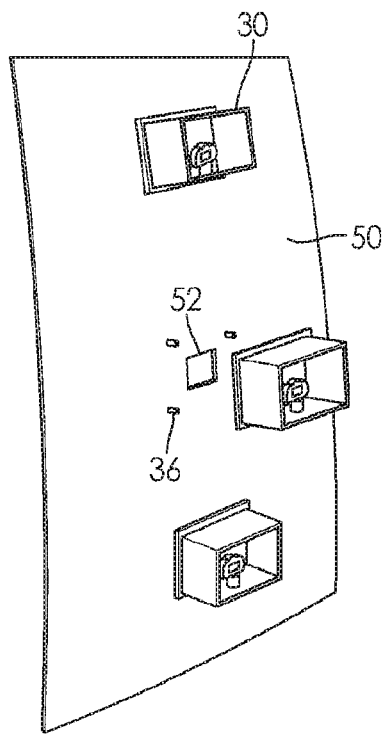
FIG. 8 illustrates the mounting of a complete camera mounting assembly to the registration bolts, with an aperture cut in the wall in accordance with embodiments of the invention.
Figure 9:
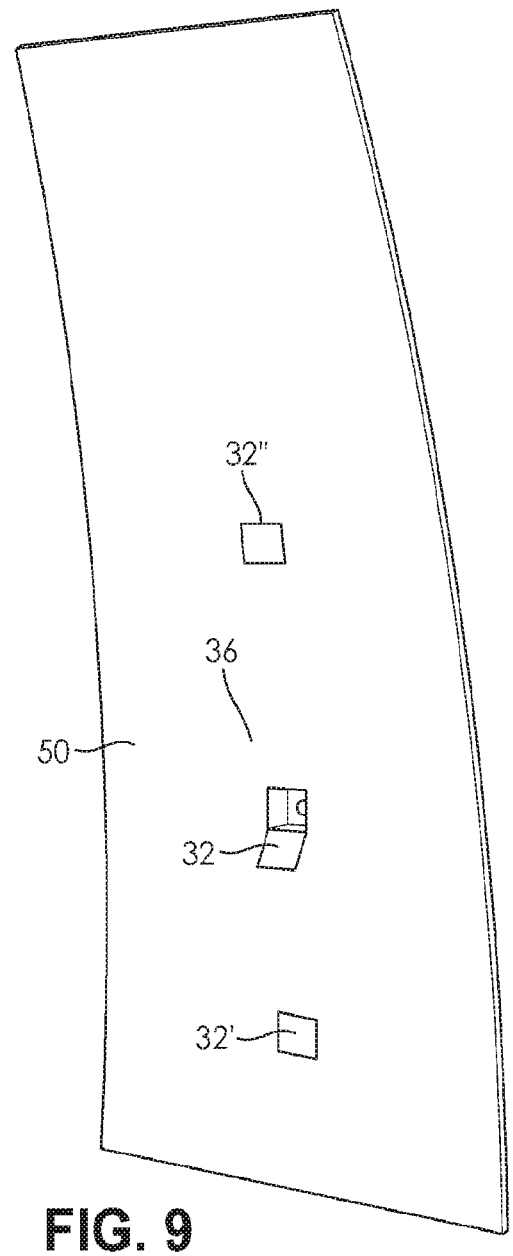
FIG. 9 shows an interior side of a wall panel with the shutter flap in an open position in accordance with embodiments of the invention.

FIG. 7 is a side view of the enclosure box 44 prior to being affixed to the frame 34, which is shown affixed to the wall 50 of a photo booth with registration bolts 36. A motor 48 is also visible for raising and lowering the shutter flap 32. By securing the frame 34 and motor 48 to the wall 50, the enclosure box 44 and the back cover 46 can be removed with a minimum of disturbance to the alignment of the shutter flap 44 to the wall 50. Thus a camera may be services, regardless of operator skill level without affecting alignment of the camera upon replacement. The registration bolts 36 remain in place with the frame 34. FIG. 8 illustrates the mounting of a complete camera mounting assembly 30 to the registration bolts, with an aperture 52 cut in the wall 50. FIG. 9 shows an interior side of a wall panel 50 with the shutter flap 32 in an open position. In a specific inventive embodiment twenty four of these panels make up a dome structure. Two additional flaps 32' and 32" are shown in a closed position. In a specific inventive embodiment, the apertures cut in the wall are nine inches by six and a half inches. The apertures may be water cut with a chamfer, with the cut out pieces of the wall being used as the shutter flaps. The seams around the shutter flap should be minimized so that the flaps do not appear in the photographs being taken from different angles.

Figure 12:
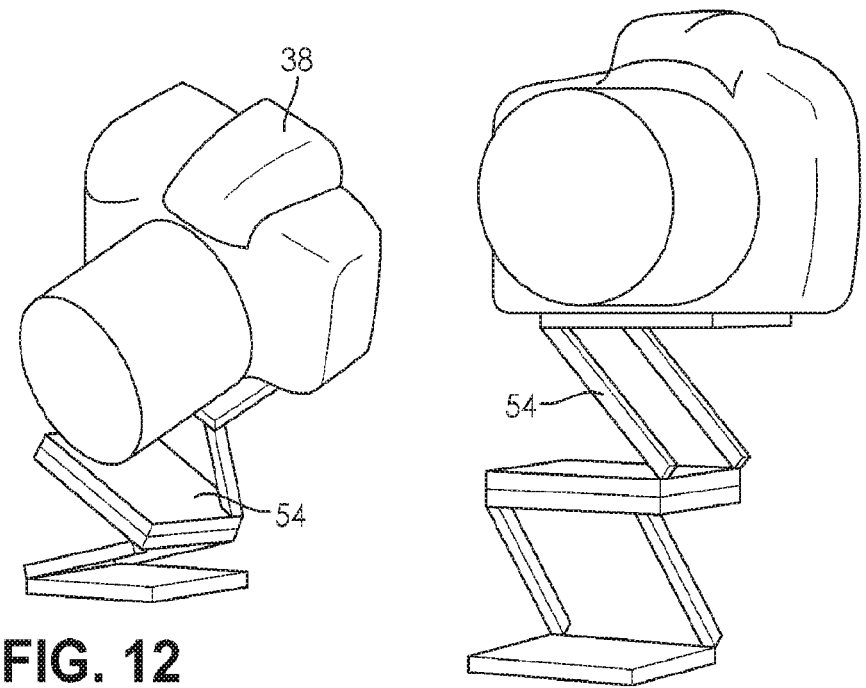
FIG. 12 illustrates an inventive camera base that folds up and down, as well as twists to position the camera.
Figures 13A, 13B, 13C:
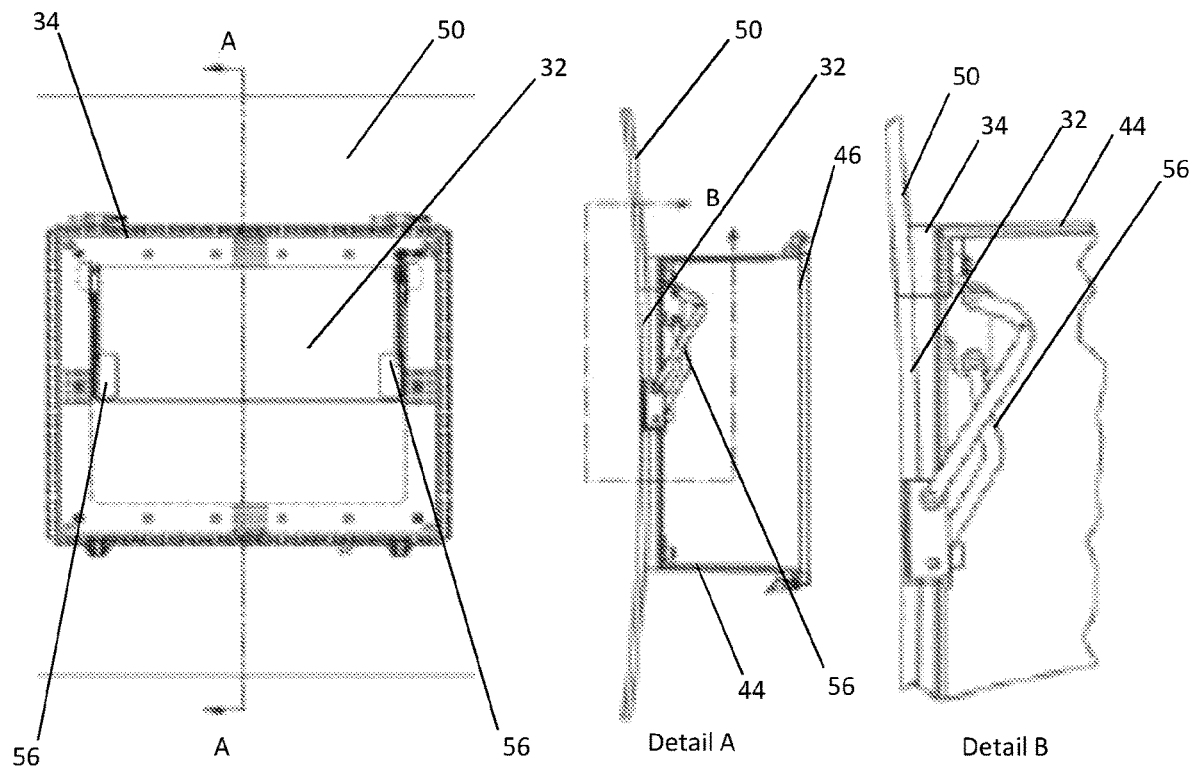
FIGS. 13A-13E illustrate a series of views of a set of articulating arms that actuate shutter flap; as the articulating arms move forward the shutter flap is lifted upwards to expose the camera, and as the articulating arms are moved inward the shutter flap is retracted downwards to cover the aperture in accordance with an embodiment of the invention.
Figures 13D, 13E:
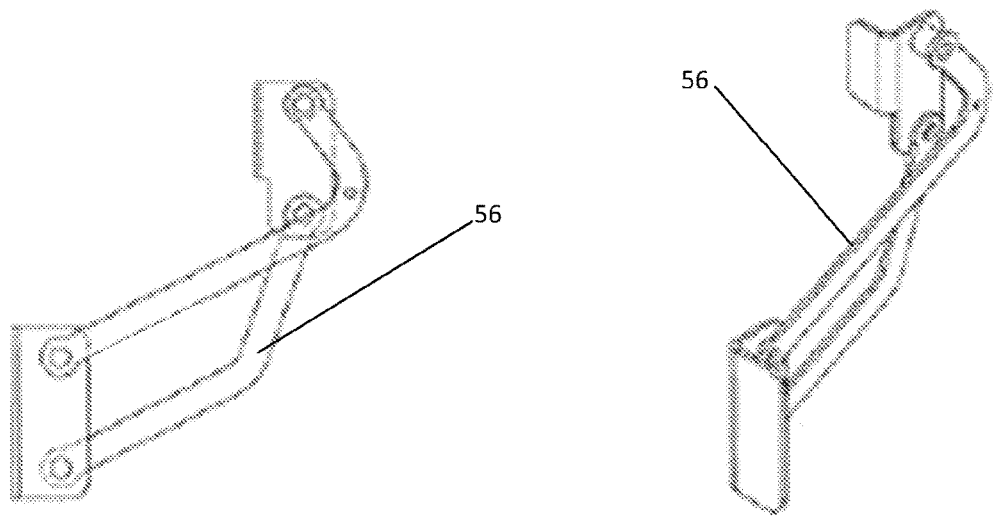

FIG. 12 illustrates an inventive camera base 54 that folds up and down, as well as twists to position the camera 38. The inventive camera base may be adapted to slide on the set of guide tracks 42 within the enclosure box 44.

FIGS. 13A-13E illustrate a set of articulating arms 56 that actuate the shutter flap 32. As the articulating arms 56 move forward the shutter flap 32 is lifted upwards to expose the camera 38, and as the articulating arms 56 are moved inward the shutter flap 32 is retracted downwards to cover the aperture 52.

Figure 14:
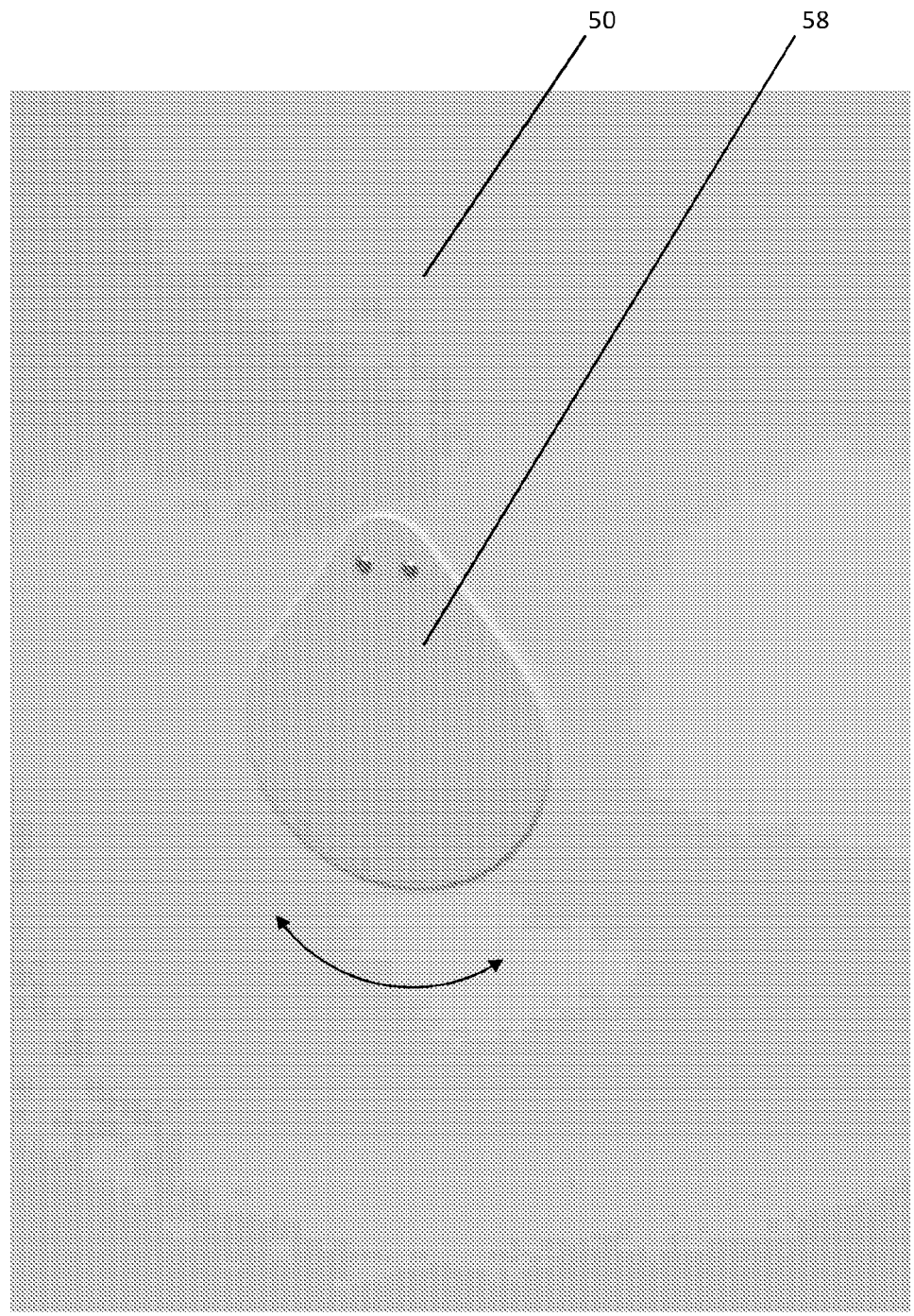
FIG. 14 illustrates a shutter flap that swings sideways to expose an aperture in the wall.
Figure 15:
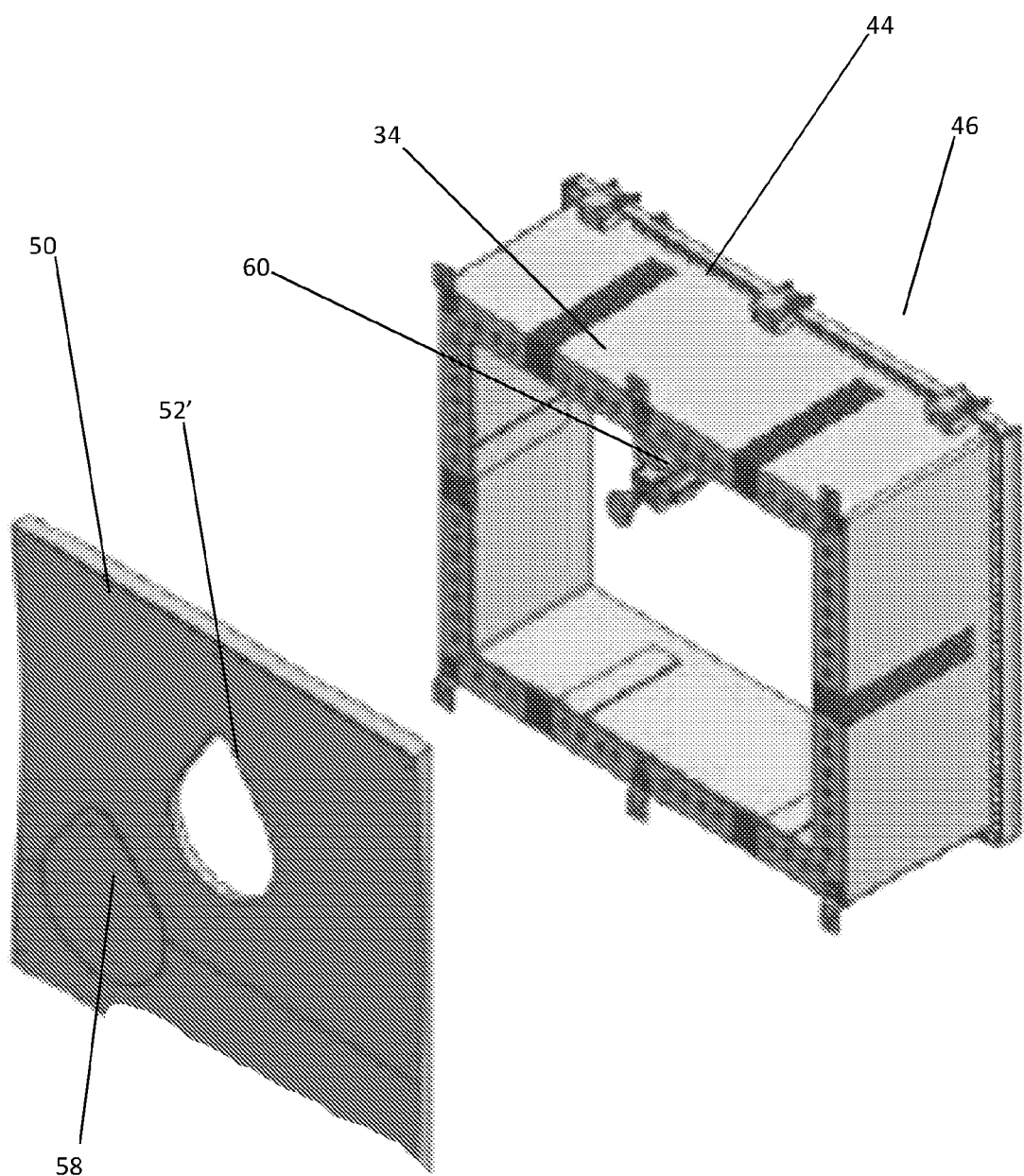
FIG. 15 illustrates an exploded view of the shutter flap of FIG. 14 that swings sideways to expose the camera aperture in the wall.
Figure 16A:
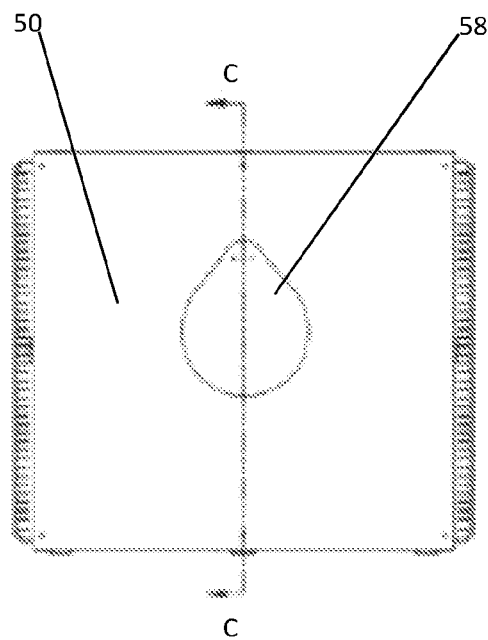
FIGS. 16A-16C are a series of detailed views of the shutter flap of FIG. 14 showing the motor connected to the shutter flap.
Figure 16B:
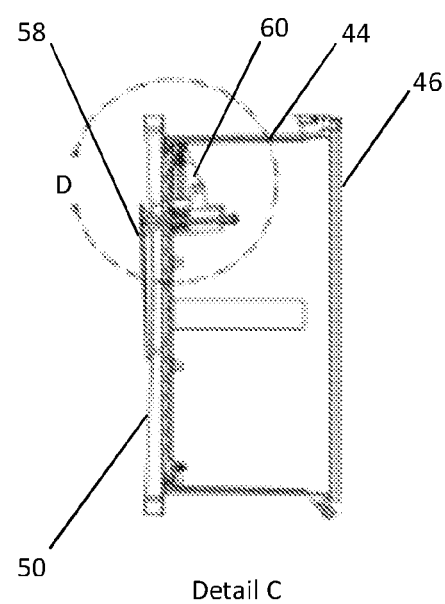
Figure 16C:
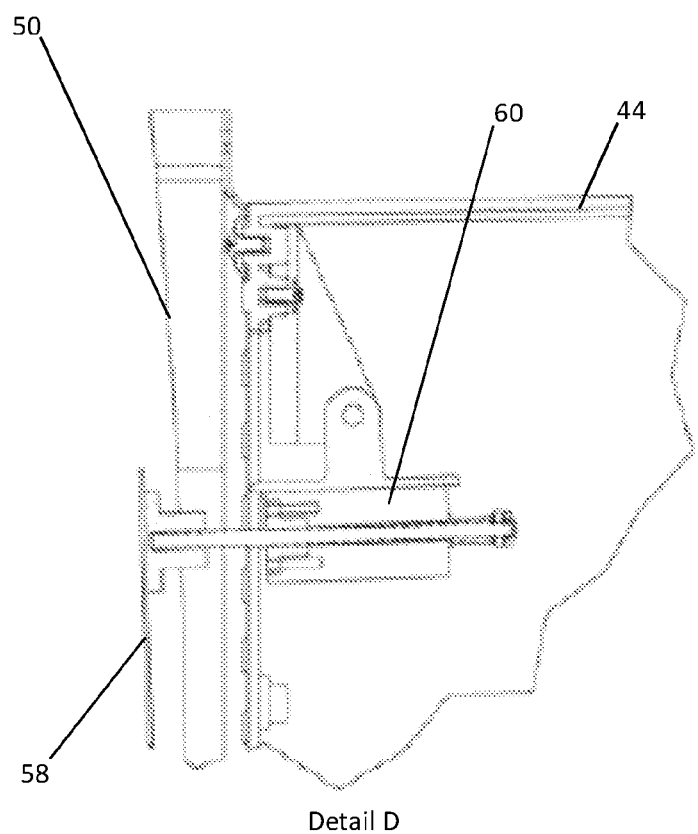

FIG. 14 illustrates a shutter flap 58 that swings sideways to expose a camera aperture in a wall. FIG. 15 illustrates an exploded view of the shutter flap 58 that swings sideways to expose the camera aperture 52' in the wall 50. A motor 60 actuates the shutter flap 58. The motor 60 is affixed to the frame 34. FIG. 16A shows the shutter flap 58 in a closed position. FIG. 16B is a cross sectional view of FIG. 16A. FIG. 16C is an expanded partial view of FIG. 16B showing the motor 60 connected to the shutter flap 58.

Figure 17A:
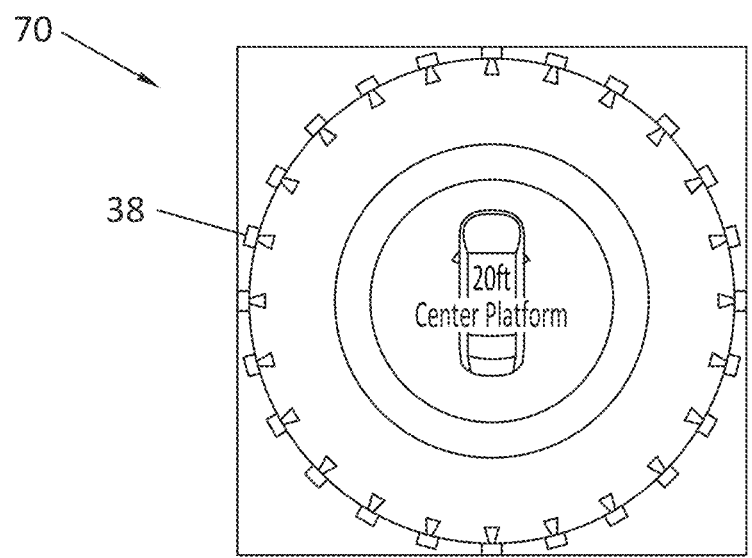
FIGS. 17A-17D are perspective views showing a photographic dome for implementing embodiments of the inventive camera mount according to embodiments of the invention.
Figure 17B:
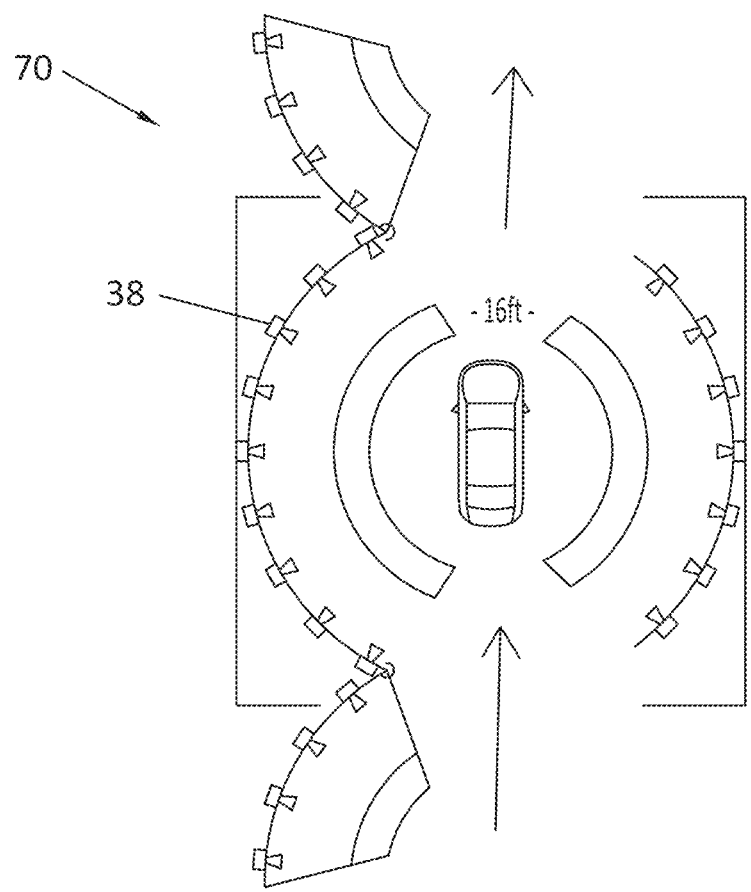
Figure 17C:
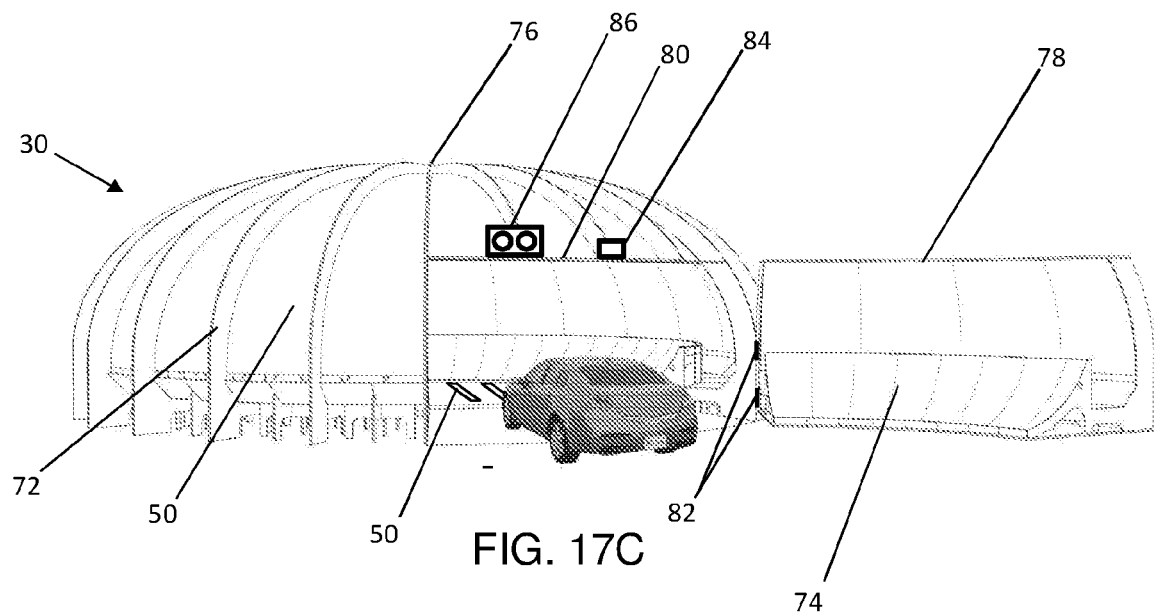
Figure 17D:
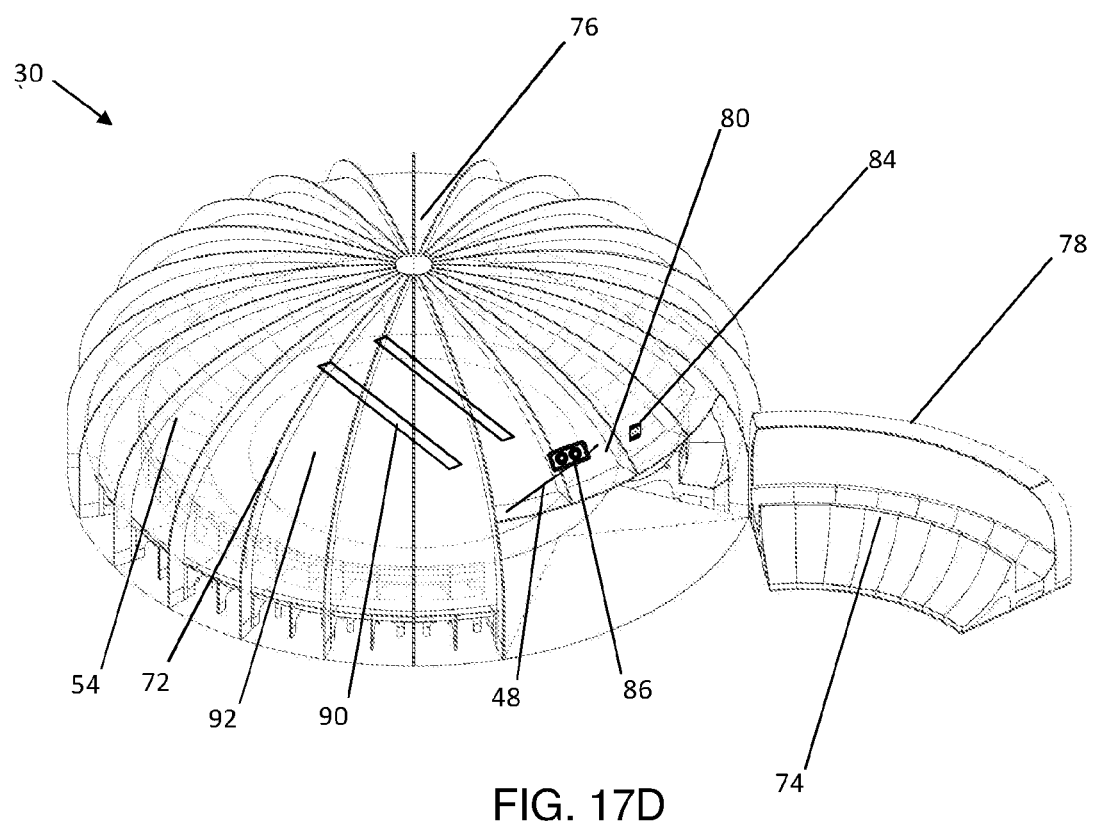

An embodiment of the enclosable circular dome photographic booth is shown generally at 70 in FIGS. 17A-17D. The booth 70 is constructed with a frame 72 with a wall panels 50 attached to the frame 72 to form a dome shaped roof 56. In a specific embodiment, a set of thermoformed panels as shown in FIG. 9 may be attached to the frame 72 to form the inner walls and photographic background of the dome 70. The dome shaped roof 76 and a matching contoured swing door 78 both have a straight, sloped, or angled horizon wall 74 and horizon lighting that in the present invention precludes secondary reflections that negatively affect image quality. The contoured swing door 78 with the horizon wall 74 and horizon lighting creates a uniform background in front corner camera shots having the entrance 80 in the background thereof. In a specific embodiment swing door 78 may have a hinged connection 82 to frame 72. An RFID reader, alphanumeric reader, or automatic bar code reader 84 may be mounted at or above the entrance 80 to read the identification tag associated with a subject vehicle. The driver of the vehicle in some embodiments may have an RFID name tag to track who shot the images or to monitor productivity. Also mounted at the entrance 80 may be a series of driver feedback lights 86 such as red and green lights. In a specific embodiment, a blue light indicates that the booth is ready for a vehicle to accept a vehicle. A green light indicates a successful RFID or barcode read and drive through. In the event of a bad RFID or barcode read and the indicator light goes red. Pressure sensor strip 48 activates the system when the vehicle tire runs over the sensor strip 48. Painted guide strips 90 provide a visual path for the driver to proceed into the booth 70 and onto the stage or platform 92. In a specific embodiment the platform 92 is stationary with a series of cameras 38 positioned about the perimeter and top of the enclosable circular dome photographic booth 70 as shown in the view of FIGS. 17A and 17B. Alternatively, in an embodiment of the inventive booth 70 the platform 92 rotates the vehicle relative to single bank of cameras.

Embodiments of the circular domed photographic booth 70 are energy efficient. In terms of power distribution, a similar system should draw 200 to 400 amps, however less than 80 amps are typically drawn in operation of embodiments of the invention. Specially sequenced relays bring each of the power zones up one at a time thereby stopping high in rush current. A number of power zones ranges from 1 to 20. The lighting system typically has between 20 and 100 strobes, while in specific embodiments, between 40 and 80 strobes. These strobes operate at 2-10 amps are load balanced so that when each zone fires only a fraction of the power load is needed. The system boots up in a fixed sequence for reliability as follows: computer, universal serial bus (USB) extension power, and camera power up one at a time, shoot all cameras in defined sequence, check to see if all image files exist (nine files in the present embodiment), if yes—run remaining boot up script—if not, restart.

In other inventive embodiments, another script is run, triggering each camera in series and each light individually or in groups. These images are automatically analyzed to determine if any of the lighting equipment is not firing. If a group of lights from a specific camera view is read as darker than it should be then each light is in turn fired and each new photograph examined to narrow down and pinpoint which lighting fixture is not working. The system then emails a supervisor with a report of the booths condition, actuation counts and percentage of expected camera and strobe life left. Included in the report are recommendations of repairs or maintenance needed as determined by analyzing the various booth data.

Figure 3A:
FIGS. 3A and 3B illustrate an existing studio configuration for generating a contrast break line on a vehicle with subtractive lighting.
Figure 3B:

Embodiments of the inventive enclosable dome photographic structure 70 employ hidden lighting elements behind a horizon wall or hip wall in the form of a gray wall 50 to create a contrast break on the side of the vehicle with subtractive lighting. The subtractive lighting method produces a booth with all bounce lighting and 100% controlled reflections on the vehicle surfaces. No reflections of the light sources or of the lighting fixtures themselves show up in the vehicle surface paint. Embodiments of the structure booth form a large smooth white room, and then subtracting that white from the reflections using the gray wall for contrast break in reflection. A totally white room would make a subject vehicle look flat and dull with no contrast, and there would be no accent of the vehicles natural body lines. The inventive enclosable dome structure employs an innovative continuous 360 degree gray wall or partial 360, or straight sections creating the same contrast break or hiding direct reflections of the lighting. as shown in FIGS. 4A-4C with the swing door 78 closed, to produce a clean horizon line in the vehicle's reflections at all angles about the perimeter of the vehicle. The shape of the structure booth 70 wraps light around the front and rear of the vehicle while also wrapping the horizon reflection around the vehicle, which allows the vehicle to be photographed from multiple angles and still have the same high end look without the need to adjust the lighting or gray wall for each shot for a given subject vehicle. A clean top edge of the horizon wall causes a crisp reflection in the vehicle, and is the break point between highlight and shadow. The use of a 360 degree gray wall differs from a typical professional studio (see FIG. 3A) where the "gray wall" is usually a strip of cloth hung on a pole and positioned between the car and the light source, and is only used on one side of the car being shot at that time and would be positioned based on what works for a single camera angle. The gray wall used in embodiments of the invention is unique in the fact that the gray wall is a fixed hard structure that is optimized to give the desired reflection on a full range of vehicle shapes and sizes from multiple camera angles. Thus while the viewing angle may change, the lighting style remains consistent across all viewpoints. The gray wall may be built from materials such as wood, composites, metals, etc., and may be in a fixed position or may be repositionable.

As shown in FIGS. 17A and 17B the cameras 38 and lighting are deployed around the parameter walls of domed photographic booth, square, or oval 70. The cameras 38 are secured by the camera mounts 30 as disclosed herein. The cameras 38 are concealed behind shutters (32, 58). The positioning of the cameras provide varying perspectives of the vehicle being photographed when the vehicle is stationary and not on a rotating platform.

Embodiments of the inventive enclosable dome photographic booth may use a curved horizon wall that both has a curved face surface and also curves around the front and back of the vehicle. The angle of the horizon wall provides bounce lighting that provides fill for the lower part of the vehicle. It is appreciated that a straight hip wall, a slant wall, or a radius wall are all operative herein. While it would be much easier to build the horizon wall as a simple vertical wall or as a slanted wall, the use of a curved face affords the lower part of the car some bounce fill light while not allowing the light to produce surface sheen on the wall and back to any of the cameras. If the wall were merely a slant board some camera angles would pick-up glare that would also show up as undesired reflections in some of the vehicle's surfaces. As light bounces off the curved gray wall surface the light is redirected at many angles and thus never builds up into a sheen, and still provides bounce light for the lower area of the vehicle. The radius of curvature of the gray wall panels may be adjusted depending on the desired lighting effect. In embodiments of the inventive drive-thru structure booth, the wall is also painted so that the wall matches the floor color and tone as seen by the cameras. The blending of the wall with the floor is at the interface between the horizon walls and the floor of the dome booth. Because the horizon wall is on a different plane and has a curved surface, the wall actually needs to be painted one tone lighter than the floor to appear as the same tone to the cameras. The horizon wall structure is also used as a place to mount and conceal the lighting. From the lighting mounted position, the lights brighten the upper portion of the dome with soft light and brightly lights the portion of the wall right above its top edge of the gray wall creating the distinctive sunset like reflection in the vehicles paint. By creating an empty space or white bounce box between the back of the gray wall and the dome wall the strobe heads can be pointed downward so the light bounces off the floor and then up the wall, which significantly makes the beam of the light wider and gives a softer quality of light, while also dramatically cutting down on the amount of space needed between the gray wall and the structure wall. In a specific embodiment, the top of the gray wall is just 20" away from the structure wall. It is noted that the versatile 360 degree horizon wall concept will work equally well in still photography, video, or three-dimensional (3D) rendering.

It is appreciated that computer-generated imagery (CGI) vehicle rendering is also accomplished with lighting angles of the present invention. If all the measurements are the same and the lighting values are the same then the virtual vehicle would look pretty much the same as a real vehicle in that environment. Even easier would be to shoot a high-dynamic-range imaging (HDRI) lighting map from the center of an inventive rotary stage. In simplest terms, a HDRI lighting dome is a sphere where the inside has a 360 panoramic image projected upon it and thought of as huge stained glass dome where the glass looks exactly like the room as viewed from the center of the room and, has an infinite amount of light being projected through it. When a reflective 3D object like a car is placed in that virtual environment, then the reflective 3D object will reflect the lighting setup exactly as it would in real life. In this example a series of photographs simulate a virtual room space.

Figure 18:
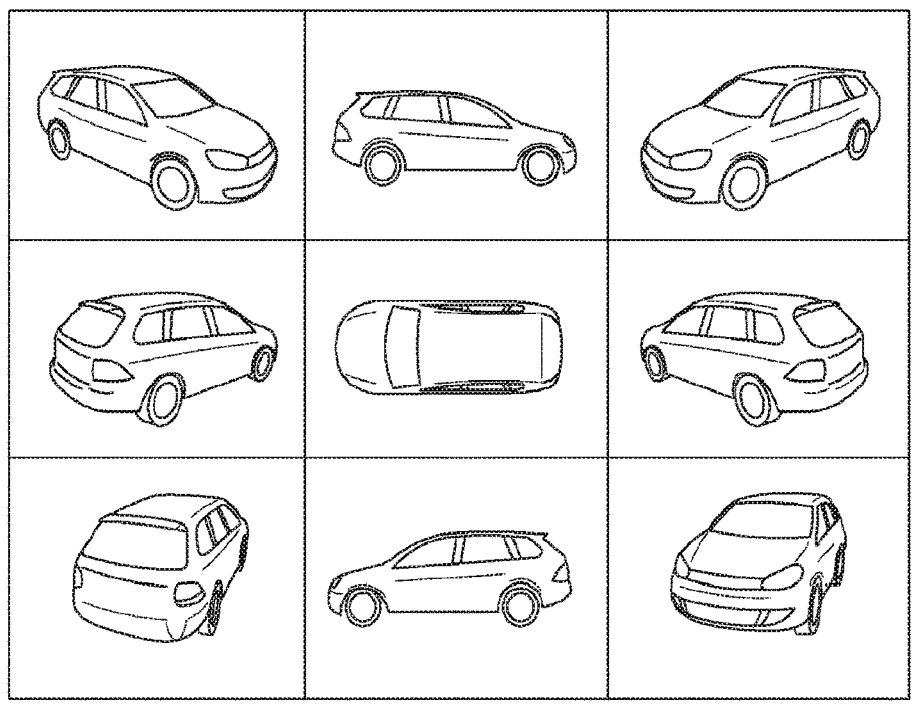
FIG. 18 is a series of high quality photographs obtained within the system of the dome photographic booth according to embodiments of the invention.

FIG. 18 is a series of high quality photographs obtained within the system of the structure booth 70 according to embodiments of the invention. It is noted that to obtain this advertising quality look in a car photograph would normally take a professional photographer and two assistants the better part of a day to create these nine angles. The images as shown in FIG. 18 were captured and produced in 15 seconds with the horizon wall lighting technique that give the vehicle a sunset look that accents the body shape of the vehicle. It is also noted that although photographers may set up single angles in this style, embodiments of the inventive domed structure booth is the first to create the horizon look over 360 degrees of vehicle reflection.

Figure 19:
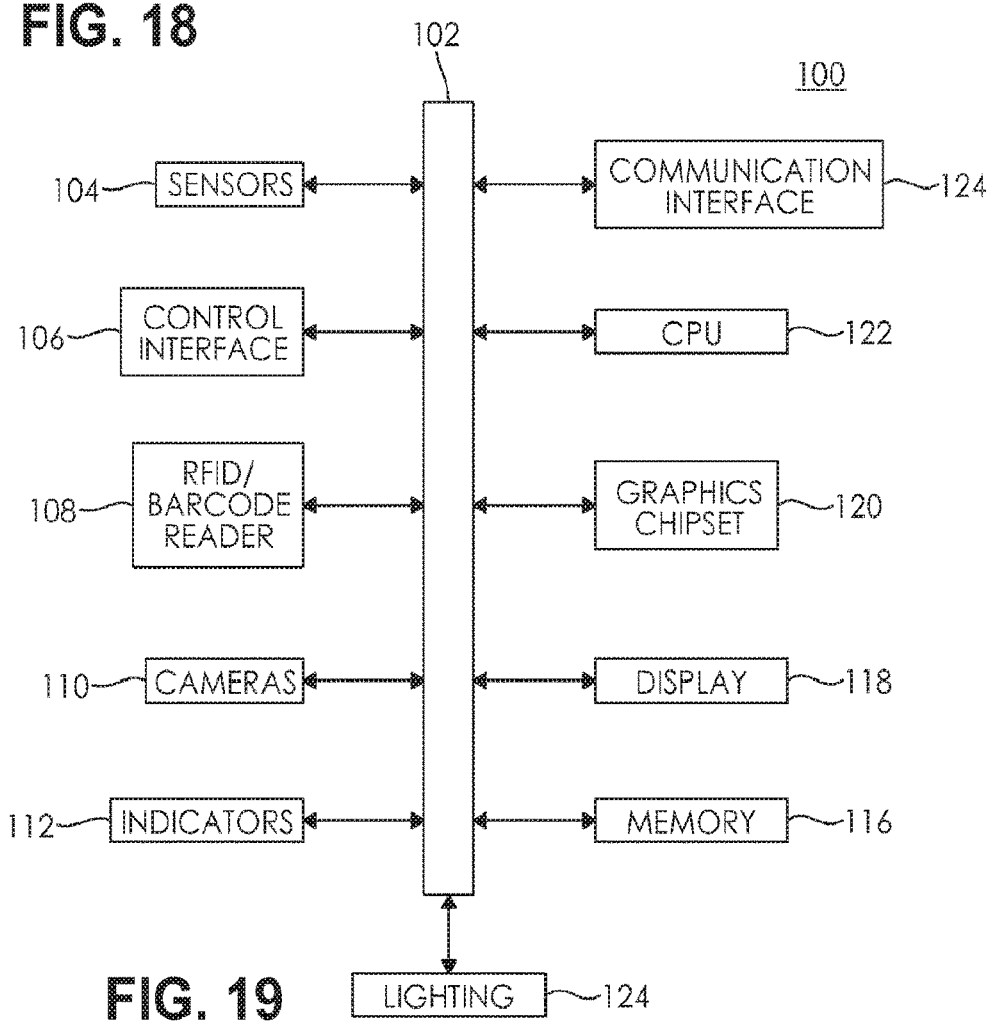
FIG. 19 is a system block diagram of the major components for photographing vehicles in accordance with embodiments of the invention.

FIG. 19 is a system block diagram 100 of the major components for photographing vehicles. A central process unit (CPU) 122 coordinates and controls the overall operation of the photographing system 100 that may be operated in the domed structure 70, and the other photographic chambers disclosed above. The communication interface 124 is representative of various links and input connections and devices illustratively including but not limited to wired and wireless links, optical drives, universal serial bus (USB), flash memory slot, and combinations thereof, for receiving and sending data that may or may not be in real time. The bus 102 links the various components in the system. Memory 116 serves as storage for operating programs and firmware for the photographic system 100. A database with vehicle and client information is stored in Memory 116. Memory 116 is made up of read-only memory ROM and random access memory (RAM). Graphics chipset 120 drives a display 118. The display 118 may be liquid crystal display (LCD), light emitting diode (LED), or other known display technologies. Control interface 106 may include knobs, buttons, and other touch sensitive controls for selecting various menu items or for inputting alphanumeric information. Sensors 104 sense the presence of a vehicle and the vehicle position. RFID/barcode 108 is a reader that detects and interprets tags mounted to vehicles or driver identification (ID) cards. Cameras 110 and lighting 114 are controlled and sequenced by the CPU 122. Indicators 112 provide visual feedback to system users. In inventive embodiments, the central process unit (CPU) 122, or master and node computers, in the case of many cameras in use—these processing nodes speedup download and system throughput, and the CPU 122 coordinates and controls the plurality of cameras in the circular domed structure 30. In specific inventive embodiments, a communication interface connects the plurality of cameras via one or more of wired and wireless links, optical drives, universal serial bus (USB), flash memory slot, and combinations thereof for receiving and sending data.

Figure 20:
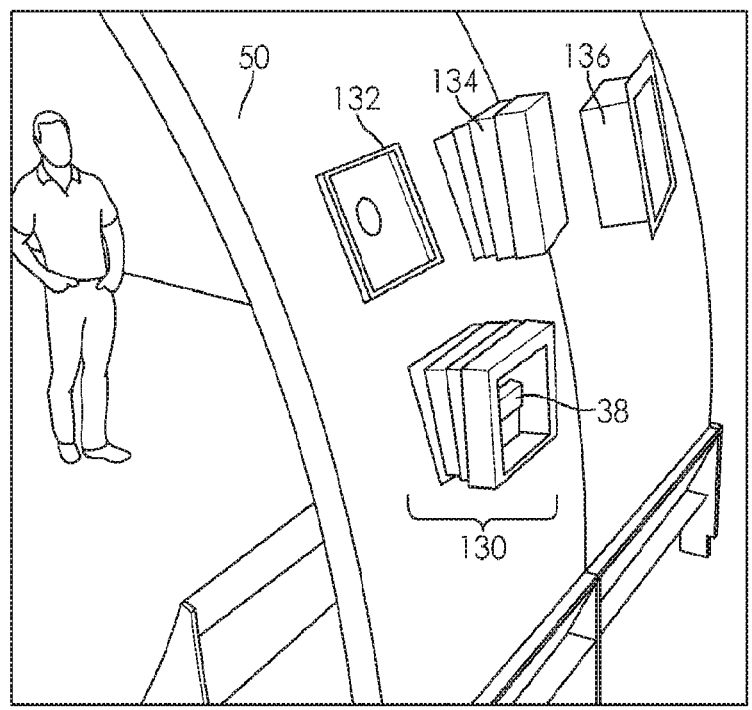
FIG. 20 illustrates an accordion like modular camera mounting system in accordance with an embodiment of the invention.

FIG. 20 illustrates a modular camera mounting system 130 that allows the installer of a photographic booth illustratively including the domed structure 70 to set the angle and tilt of each camera 38, and then allows untrained operators to swap out cameras 38 without the need to rearm the cameras. The modular camera mounting system 130 has a flexible accordion extension 134 that locks into a frame 132 installed in the panel wall 50 of the photographic booth. The camera 38 is mounted square and plumb in a camera and electronics module or enclosure box 136 that attaches to the accordion extension 134. The module or enclosure box 136 may also have lighting elements. The accordion extension 134 allows the camera module or enclosure box 136 to pan and tilt and may be locked in position during installation, and this allows camera modules or enclosures 136 to be swapped out without the need to be re-aimed.

Figure 21:
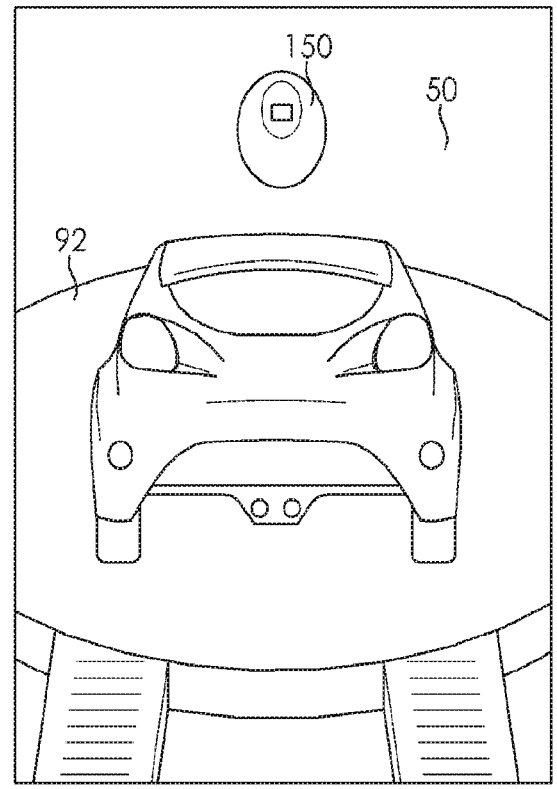
FIG. 21 is a photograph showing a projection system in accordance with an embodiment of the invention.

FIG. 21 is a photograph showing a projection system display 150. In a specific inventive embodiment the projection system display 150 is projected on to the wall 50 of the photographic chamber, and provides the view from the top down camera to aid a driver in centering a vehicle in the photographic chamber. The projection system may also be used in conjunction with the vehicle data base to show a photographer step by step which interior and details photos that are needed for that vehicle. For example, a sample graphic or photograph of the next shot needed is projected along with notes on which lighting preset to use, Furthermore, the projection may provide consistency reminders like "straighten the steering wheel". The projection system may also display a running clock or countdown clock to keep the photographer moving according to the facilities production schedule. If what is being projected is also being recorded, the operator's performance can be evaluated against the direction given by the automated system. It is noted that since the flash units for the image taking cameras are so much brighter than the projected image, the projection image is washed out and never shows up in the photographs.

As a person skilled in the art will recognize from the previous detailed description and from the figures and claims, modifications and changes can be made to the preferred embodiments of the invention without departing from the scope of this invention defined in the following claims.

The invention claimed is:

1. A camera mount for photographing vehicles in a photographic booth, the mount comprising:
   a frame affixed to an outer portion of a wall of the photographic booth with a set of registration bolts;
   an enclosure box with a set of guide tracks, said enclosure box removably connected to said set of registration bolts;
   a base for supporting a camera, said base riding along said set of guide tracks; and
   a shutter flap attached to said frame, and positioned in or over an aperture in the wall, the aperture providing a field of view for said camera, where said shutter flap is in an open position when the camera is in operation, and is closed otherwise.

2. The mount of claim 1 wherein said camera connects to said base with quick release mounting hardware.

3. The mount of claim 1 further comprising a motor to actuate said shutter flap.

4. The mount of claim 3 wherein said motor is secured to said frame.

5. The mount of claim 3 further comprising a set of articulating arms that actuate the shutter flap, wherein as the set of articulating arms move forward the shutter flap is lifted upwards to expose said camera, and as the set of articulating arms are moved inward the shutter flap is retracted downwards to cover the aperture.

6. The mount of claim 3 wherein said motor actuates said shutter flap from side to side to uncover the aperture to expose said camera.

7. The mount of claim 1 wherein said shutter flap has the same color as an interior facing of the walls of the photographic booth.

8. The mount of claim 1 wherein said shutter flap is cut from the wall with a chamfer edge to form the aperture.

9. The mount of claim 1 wherein the photographic booth is a dome structure.

10. The mount of claim 1 wherein said frame further comprises a flexible accordion extension.

11. The mount of claim 1 wherein said base has a structure that folds up and down, as well as twists to position said camera.

12. The mount of claim 1 further comprising a back cover removably affixed to a rear portion of the enclosure box.

13. A system for photographing vehicles, the system comprising:
   one or more camera mounts of claim 1 attached to the walls of the photographic booth;
   at least one camera, video system, or computing system to generate image data from a vehicle positioned therein;
   a lighting system; and
   a tracking system to actuate one or more of a plurality of cameras, shutter flaps, and lights in a predetermined sequence and combination based on the position of the vehicle.

14. The system of claim 13 further comprising at least one of a radio frequency identification (RFID) reader, alphanumeric reader, or bar code reader for identifying vehicle and client parameters, and preferences, upon entry into said circular domed structure.

15. The system of claim 14 wherein said RFID reader, said alphanumeric reader, or said bar code reader obtains a vehicle identification number (VIN) or a dealer stock number of the vehicle to be processed; and
   wherein a set of information related to the vehicle is encoded in said VIN or the dealer stock number, said set of information comprising one or more of vehicle make, model, body style, or vehicle color.

16. The system of claim 15 said set of information encoded in said VIN is used to automatically adjust lighting, the height and/or angle of a gray wall of said wall to adjust photographic conditions, as well as the height, zoom, and camera placement/position of said plurality of cameras for the subject vehicle to be processed.

17. The system of claim 13 further comprising a central process unit (CPU), or master and node computers in that in case of many cameras in use these processing nodes speedup download and system throughput, said CPU coordinates and controls said plurality of cameras in the circular domed structure; and
   wherein a communication interface connects said plurality of cameras via one or more of wired and wireless links, optical drives, universal serial bus (USB), flash memory slot, and combinations thereof for receiving and sending data.

18. The system of claim 13 further comprising a database with vehicle and client information.

19. A process for photographing a vehicle comprising:
   driving the vehicle into the photographic booth of claim 1;
   selectively illuminating a first subset of lights arrayed in the dome;
   selectively opening a first shutter flap from one or more shutter flaps positioned in said photographic booth;
   collecting a first photograph of a plurality of photographs of the vehicle with illumination from said first subset of lights;
   closing the first shutter flap;
   selectively illuminating a second subset of lights arrayed in the dome and opening a second shutter flap; and
   collecting a second photograph of the plurality of photographs of the vehicle with illumination from said second subset of lights.

20. The process of claim 19 further comprising:
   selectively illuminating additional subsets of lights arrayed in the dome and opening and closing additional shutter flaps; and
   collecting additional photographs of the plurality of photographs of the vehicle with illumination from said additional subsets of lights.

* * * * *